United States Patent [19]

Ely

[11] Patent Number: 4,672,552

[45] Date of Patent: Jun. 9, 1987

[54] METHOD AND APPARATUS FOR CONTROLLING ROTARY VENEER LATHE KNIFE TO OPTIMIZE MATERIAL USAGE

[75] Inventor: Gary W. Ely, Canby, Oreg.

[73] Assignee: The COE Manufacturing Company, Painesville, Ohio

[21] Appl. No.: 694,415

[22] Filed: Jan. 24, 1985

[51] Int. Cl.$^4$ ............................................. G06F 15/00
[52] U.S. Cl. ...................................... 364/475; 82/2 B
[58] Field of Search ............... 364/474, 475; 318/571; 82/2 B; 144/209 A, 209 R

[56] References Cited

U.S. PATENT DOCUMENTS

| | | | |
|---|---|---|---|
| 4,287,462 | 9/1981 | Beck ..................................... | 364/475 |
| 4,379,477 | 4/1983 | Shrum ................................. | 364/474 |
| 4,396,049 | 8/1983 | Calvert et al. ...................... | 364/174 |
| 4,494,588 | 1/1985 | Berry et al. ......................... | 364/474 |
| 4,587,616 | 5/1986 | Weil .................................... | 364/475 |

Primary Examiner—Jerry Smith
Assistant Examiner—Allen MacDonald
Attorney, Agent, or Firm—Klarquist, Sparkman, Campbell, Leigh & Whinston

[57] ABSTRACT

A method and apparatus minimize the amount of waste veneer cut by a rotating veneer lathe after a peel break by coordinating the contour of the previous peel spiral with the motion including the path, speed, and position of the knife as it reengages the surface of the rotating log from which the veneer is cut. Upon a command to resume peeling, the knife moves from a standby location toward the surface of the block at a first peel rate and reengages the block at a second peel rate. The approach path toward and entry location on the surface of the rotating block defined by the first and second peel rates promote the cutting of continuous veneer of a desired thickness at the largest possible block radius.

20 Claims, 6 Drawing Figures

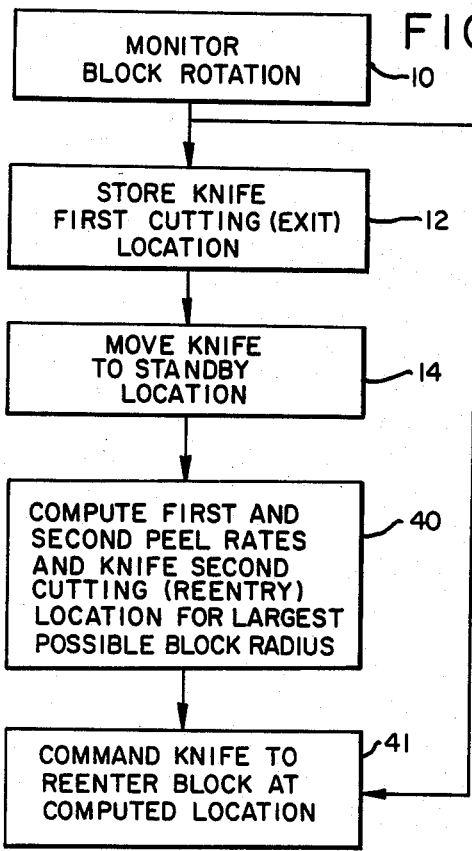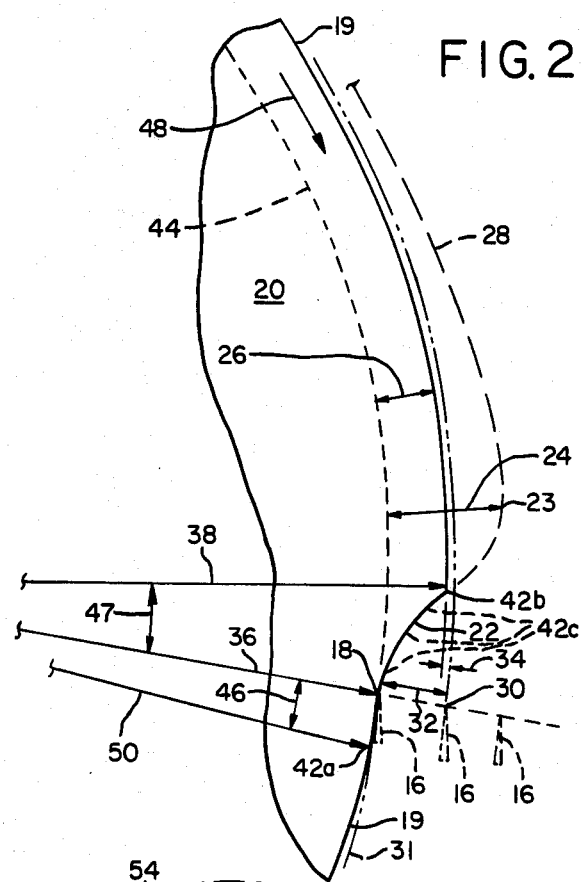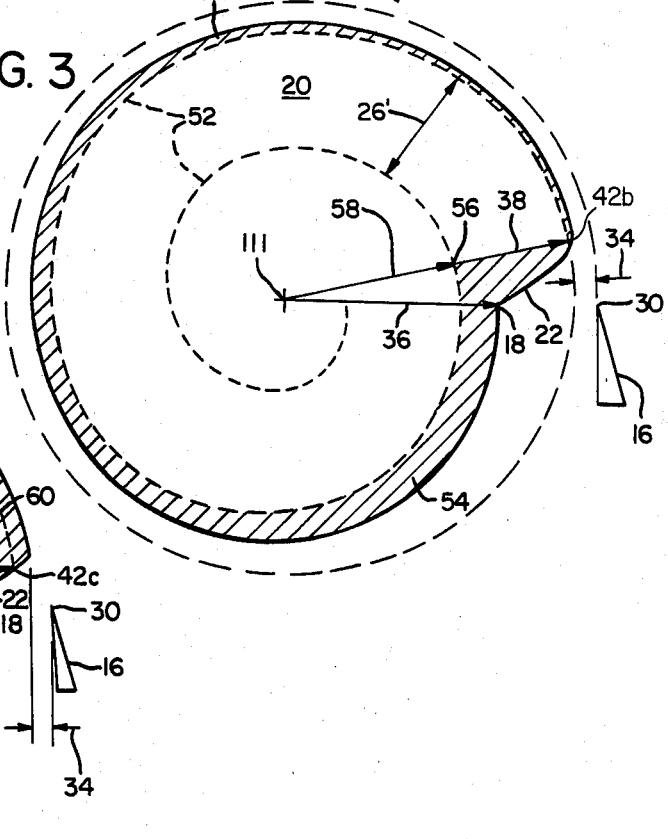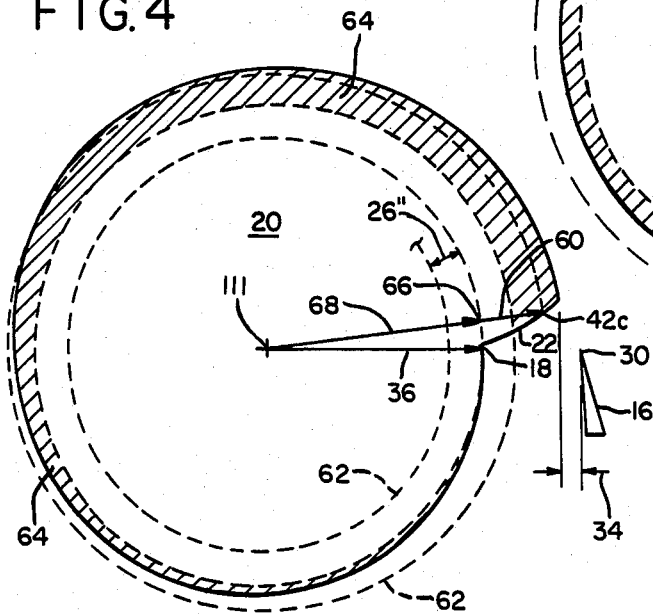

METHOD AND APPARATUS FOR CONTROLLING ROTARY VENEER LATHE KNIFE TO OPTIMIZE MATERIAL USAGE

BACKGROUND OF THE INVENTION

The present invention relates to rotary veneer lathes, and in particular, a method and an apparatus that minimize the waste veneer cut after a peel break by coordinating the contour of the previous peel spiral with the motion including the path, speed, and position of the knife as it reengages the surface of the rotating log from which the veneer is cut.

A rotary veneer lathe includes means to rotate a log or block about its longitudinal axis and means to advance a knife into the surface of the block to cut veneer from it. The edge of the knife extends along the length of the block and is advanced into its surface at a rate that causes the peeling of veneer of a uniform predetermined thickness. A conventional rotary veneer lathe accomplishes this task by monitoring the angular displacement of the rotating block and advancing the knife a distance equal to the desired veneer thickness with each rotation of the block.

During a production operation, it is frequently necessary to interrupt and later resume peeling veneer from the same block. An interruption in peeling is called a "break," and a resumption of peeling is called "reentry." The break and reentry process has been accomplished traditionally by, respectively, stopping and restarting the advance of the knife at the rate that provides the desired veneer thickness. This procedure causes significant waste in the form of a long taper at break on the trailing edge of the veneer as the knife cuts free from the block, and at reentry on the leading edge of the veneer as the knife reengages the block. The amount of waste is nominally one circumference of the block for each veneer taper generated.

A veneer lathe control system for reducing the amount of waste veneer cut during break and reentry is described in U.S. Pat. No. 4,287,462 of Beck et al. The control system of the Beck et al. patent monitors the angular displacement of a rotating block and stores in a memory the orientation of the radial point on the block from which the knife exits during a peel break. The knife rests at a standby location that is spaced from the peel break location on the block surface by a distance that is an integer multiple of the thickness of the previous peel spiral. The control system guides the knife from the standby location at a peel rate corresponding to the thickness of the previous peel spiral to reengage and resume peeling of the block at the radial point stored in memory.

The Beck et al. control system suffers from the disadvantage that a reduction in waste veneer is realized only when there is no change in peel thickness from break to reentry. There is no means for modifying the knife approach path or its reentry point to promote the cutting of continuous veneer at the largest possible block radius whenever the peel thickness after reentry differs from that before break. This deficiency is especially important in the situation in which the thickness of veneer peeled before break is less than that peeled after reentry. The excessive number of block rotations required to reach continuous veneer of the desired thickness necessitate that the knife reengage the block at a location which minimizes the amount of waste veneer cut in this situation.

SUMMARY OF THE INVENTION

An object of the present invention is, therefore, to provide in the peeling of continuous veneer a method and an apparatus that minimize the amount of waste veneer cut during break and reentry in a peeling operation.

Another object of this invention is to provide such a method that during reentry coordinates the contour of the previous peel spiral with the motion including the path, speed, and position of the knife as it reengages the surface of the rotating block.

A further object of this invention is to provide such a method that defines for the knife an approach path toward and reentry location on the surface of the rotating block that promotes the cutting of continuous veneer of any desired thickness at the largest possible block radius.

Still another object of this invention is to provide such a method in which a reduction in waste veneer is accomplished by reengagement of the knife with the block at a cutting location that differs from the cutting location at peel break.

Yet another object of this invention is to provide an apparatus for application of such a method.

-Additional objects and advantages of the present invention will be apparent from the following detailed description of a preferred embodiment thereof, which proceeds with reference to the accompanying drawings.

BRIEF DESCRIPTION OF THE DRAWINGS

FIG. 1 is a block diagram illustrating the steps of the method of the present invention.

FIG. 2 is an enlarged fragmentary end view of a block with different locations of the knife shown in phantom relative to the surface of the block during break and reentry.

FIG. 3 is an end view of a block showing in phantom a veneer peel spiral of a thickness that is greater than that cut prior to a peel break.

FIG. 4 is an end view of a block showing in phantom a veneer peel spiral of a thickness that is less than that cut prior to a peel break.

DETAILED DESCRIPTION OF PREFERRED EMBODIMENT

Figure 5:
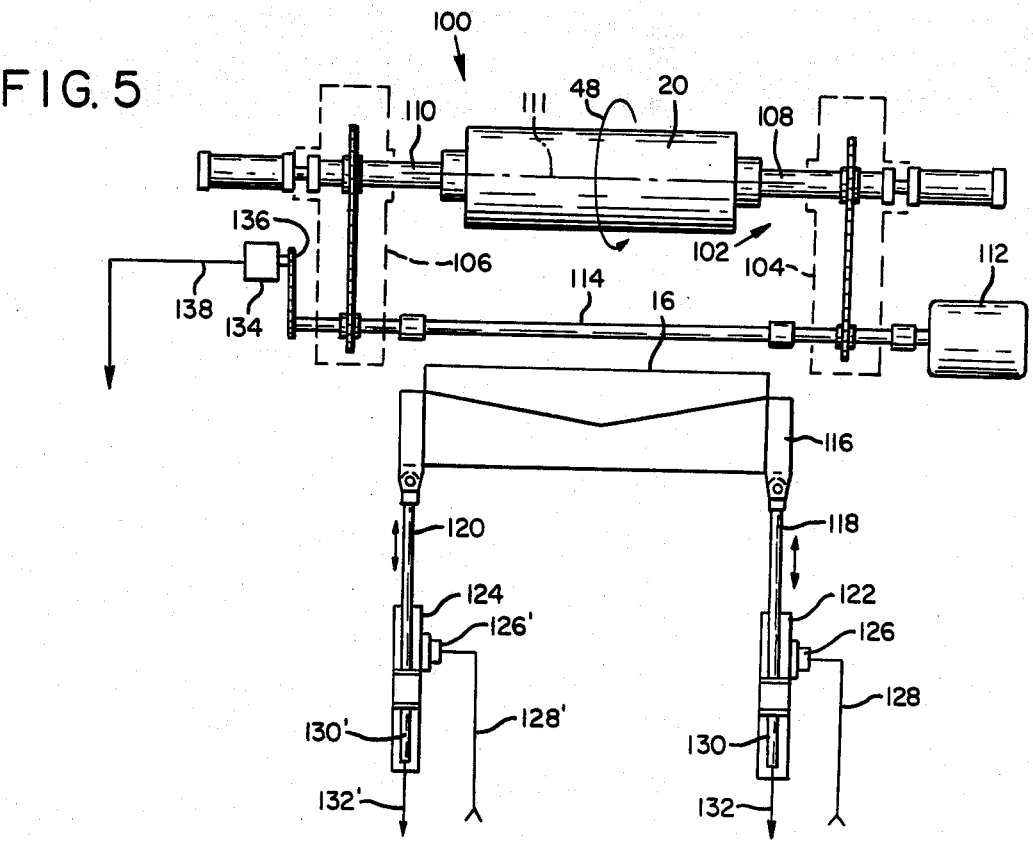
FIG. 5 is a schematic diagram of a plan cross-sectional view of a veneer lathe whose knife movement is controlled in accordance with the invention.

The method of the present invention comprises in the peeling of veneer by a rotary veneer lathe the steps of sensing the angular displacement of the rotating block as the knife engages and cuts from the block a veneer of a first peel thickness, moving the knife from a first cutting location to a standby location at a predetermined distance away from the surface of the block, storing information corresponding to the angular position of the first cutting location, and commanding the knife to move toward the block and reengage it at a second cutting location that is computed from the stored information. The second cutting location differs from the first cutting location and enables veneer to be cut at substantially the largest possible block radius, thereby promoting production of essentially an optimal amount of veneer of a second peel thickness.

FIG. 1 is a block diagram that illustrates the steps of the method of this invention. With reference to FIG. 1, process step 10 represents the continuous monitoring of the angular displacement of the block as it rotates about its longitudinal axis. The angular displacement of the block is monitored by means of a serial stream of 12,000 uniformly spaced digital pulses that are generated with each rotation of the block. The time interval elapsed between adjacent pulses represents, therefore, the time required for the block to rotate 0.03°.

Whenever it is necessary to institute a peel break of veneer of the first peel thickness, the knife moves and comes to rest at a standby location away from the surface of the block in the same manner, irrespective of the second peel thickness of veneer cut after the knife reengages the block.

Process step 12 represents the storage of digital word information identifying the one pulse in the stream of 12,000 pulses that appears as the control system executes a command to retract the knife at the start of a peel break. The stored digital information, which is called the break pulse number, corresponds to the exit or first cutting location of the knife along the peel spiral of the first veneer thickness. Process step 14 represents the movement of the knife away from the block to a standby location. The path of knife travel is shown in FIG. 2.

With reference to FIG. 2, whenever the data processing system that controls the knife movement executes a PEEL BREAK command, knife 16 moves away from first cutting location 18 on the surface 19 of block 20 along an exit path segment 22 to a location 23 off the surface of block 20. Exit path segment 22 defines an arcuate path having a contour that is determined by the speed with which knife 16 moves off and away from block 20. Distance 24 is the radial distance between first cutting location 18 and location 23 and equals twice the first peel thickness 26.

Knife 16 then moves along an approach path segment 28 that converges to a standby location 30, which is spaced from the surface of the block by a radial distance 32 equal to the sum of first peel thickness 26 and a leading thickness offset (LTO) 34, a field settable variable of approximately 0.02 inch. The LTO need not and typically does not bear any relationship to the first peel thickness. The purpose of the LTO is to prevent unwanted shaving of the block surface as the knife moves relative to the spiral of the first peel thickness during reentry. In its standby location, knife 16 clears the surface 19 of block 20 by at least the LTO 34 distance. First cutting location 18 defines, therefore, the minimum radius 36 of block 20 prior to the peel break. The maximum radius 38 of block 20 equals the sum of minimum radius 36 and first peel thickness 26.

A RESUME PEELING command enables the movement of knife 16 toward the rotating block 20, which movement commences immediately after a predetermined location that is angularly displaced by a small amount relative to the first cutting location 18 moves past knife 16. The predetermined angularly displaced location is the reentry or second cutting location as defined in the situation in which the first peel thickness equals the second peel thickness. The production of an optimal amount of veneer of the second peel thickness requires that different second cutting locations exist depending upon the difference between the first peel thickness and the second peel thickness. Each of the second cutting locations is identified in the drawings by the reference numeral 42 followed by one of the lower case letters a, b, or c.

With reference to FIG. 1, process step 40 represents the computation of the knife movement reentry rates toward and the reengagement location on the block surface. The difference between the first peel thickness and the second peel thickness specifies the appropriate knife movement rates and reengagement location. Process step 41 represents the execution of the knife reentry process in accordance with the information computed in process step 40.

With reference to FIG. 2, whenever the second peel thickness equals the first peel thickness, knife 16 moves from standby location 30 toward block 20 along a path 31 at a first peel rate that equals the sum of the peel rate that generated peel spiral 44 of the first peel thickness and the peel rate that corresponds to the LTO 34. (For purposes of clarity, only the segment of path 31 near second cutting location 42a is shown in FIG. 2.) The term "peel rate corresponding to a given thickness" is used herein to mean the rate at which the knife would advance toward the center of the block to cut continuous veneer of the given thickness. After one rotation of block 20 at the first peel rate, the knife is closer to the block by a distance equal to the sum of the LTO and the second peel thickness. The LTO distance from the block, therefore, has been eliminated. After the one rotation, knife 16 reengages the block surface at second cutting location 42a and next moves toward the center of block 20 at a second peel rate that corresponds to the second (as well as the first since they are equal) peel thickness. The knife begins to retrace original peel spiral 44 at second cutting location 42a which is displaced by angle 46, a field settable amount which typically ranges between 2° and 3°, from the first cutting location 18 in the direction 48 of the block rotation. Reengagement of block 20 by knife 16 prior to its striking the block surface discontinuity, which is coincident with exit path segment 22, promotes the clearing of any mechanical backlash in the lathe system before peeling of continuous veneer of the first thickness resumes.

Second cutting location 42a defines a block radius 50 of substantially the same length as that of minimum radius 36, which defines the maximum possible block radius for peeling continuous veneer of a thickness that is the same before and after a peel break. Typically, only about 3 inches of veneer length is wasted during the above-described break and reentry process.

Whenever the second peel thickness is greater than the first peel thickness, knife 16 moves toward block 20 from standby location 30 at a first peel rate that corresponds to the LTO 34. The first peel rate causes knife 16 to reengage block 20 at second cutting location 42b, which coincides substantially with the block radius 38. Knife 16 reengages the surface of block 20 after it completes one rotation after the start of reentry. After the one rotation of block 20 at the first peel rate, the LTO distance has been eliminated and knife 16 begins to cut into block 20. Knife 16 moves toward the center of block 20 at a second peel rate that corresponds to the second peel thickness. Second cutting location 42b is, therefore, angularly displaced from first cutting location 18 by angle 47 in a direction opposite to direction 48 of the block rotation.

FIG. 3 shows the tapered removal of waste veneer as knife 16 enters block 20 at second cutting location 42b and peels veneer at a rate corresponding to a second peel thickness 26' of 1.5 times that of the first peel thickness. Broken line 52 indicates the peel spiral of the second peel thickness. Cross-hatched region 54 indicates the amount of waste veneer cut before knife 16 reaches location 56 where peeling of veneer of the second thickness commences. After the completion of one block rotation, cutting of continuous veneer of the second thickness begins as knife 16 reaches location 56, which defines a radius that equals the minimum radius 36 minus the difference between the second peel thickness and the first peel thickness. Location 56 defines the largest possible block radius 58 that produces continuous veneer of the second thickness.

Whenever the second peel thickness is less than the first peel thickness, knife 16 moves from standby location 30 toward block 20 at a first peel rate for a distance computed as described below and then advances at a second peel rate that corresponds to the second peel thickness. The first peel rate causes the knife to engage the surface of block 20 at a second cutting location 42c somewhere along exit path segment 22 between minimum radius 36 and maximum radius 38. This location corresponds to a reentry block radius, R, which is computed from the following expression:

$$R = R_{min} + \text{integer}(T_1/T_2) \times T_2 - A;$$

where $R_{min}$ is minimum radius, integer $(T_1/T_2)$ is the integer value of first thickness/second thickness, $T_2$ is second thickness, and A is a constant.

The quantity $T_1/T_2$ is called the thickness ratio, and A equals the second peel thickness for a thickness ratio remainder of less than 0.05, and 0 for all other such remainder values.

The constant A is included in the expression to limit the maximum thickness of waste veneer cut to the sum of the second thickness and 0.05 inch. The added 0.05 inch prevents an occlusion in the space between the knife and a pressure-roller bar provided on the veneer lathe apparatus. The reentry block radius specifies the reentry point on the surface of block 20 that provides continuous veneer of the second thickness at the largest possible block radius. The first peel rate is the peel rate that corresponds to the distance between standby location 30 and the computed reentry block radius. After one rotation of block 20 at the first peel rate, knife 16 has cut into block 20 a distance approximately equal to the difference between the computed reentry radius and maximum radius 38. After the one rotation, knife 16 moves toward the center of block 20 at a second peel rate that corresponds to the second peel thickness.

FIG. 4 shows the tapered removal of waste veneer as knife 16 enters block 20 at second cutting location 42c and peels veneer at a rate corresponding to a second peel thickness 26'' of 0.4 times that of the first peel thickness. Exemplary values of 0.25 inch and 0.1 inch for, respectively, the first peel thickness and the second peel thickness are used herein for purposes of illustration. Substituting these values in the expression above gives a reentry block radius, R:

$$= R_{min} + \text{integer} (2.5) \times 0.1 - 0$$

$$= R_{min} + 0.2.$$

The reentry block radius is indicated by reference numeral 60 in FIG. 4. Second cutting location 42c is, therefore, positioned along exit path segment 22 about two second peel thicknesses away from the first cutting location 18.

Broken line 62 indicates the peel spiral of the second peel thickness. Cross-hatched region 64 indicates the amount of waste veneer cut before knife 16 reaches location 66 where peeling of veneer of the second thickness commences. Location 66 defines the largest possible block radius 68 that produces continuous veneer of the second thickness. Radius 68 is approximately equal to minimum radius 36. Depending on the thickness ratio, waste veneer is produced during one or more block rotations. In the example given, two such rotations are required.

It will be appreciated that at the start of reentry, knife 16 begins movement from standby location 30 before the first cutting location 18 passes knife 16 by an amount equal to the displacement angle 46 of between 2° and 3°. As will be described below, this causes a negligible reduction in the peeling of an optimum amount of continuous veneer of the second peel thickness but simplifies the software implementation of the method. In addition, whenever the first and second peel thicknesses are not equal, there exists no need for compensation for mechanical backlash in the system because there is waste veneer generated during reentry. The creation of veneer waste under these conditions is incidental in developing the largest possible block radius that provides substantially an optimal amount of continuous veneer of the second thickness.

The above-described method of moving the knife during break and reentry also has application in a "round-up" procedure, which is the removal of high spots from the irregular surface of a block that has not been previously peeled. During round-up, knife 16 moves toward and cuts into the surface 19 of block 20 at a peel rate that provides veneer pieces at a size that is large enough to be saved, for example, for plywood production. The decision to terminate round-up may be made by means of visual inspection by the lathe operator, data produced by photosensors that detect the number and length of veneer pieces emerging from the lathe, or a scanner device that determines the knife position and compares it to a block radius that is predicted to produce full-width veneer of the desired thickness.

Upon termination of round-up, the data processing system controlling knife movement causes knife 16 to cut veneer at a first peel rate corresponding to the desired first thickness as block 20 completes at least one rotation. After the one rotation, a peel break is executed in the manner described above. The peel break provides an opportunity to clear the lathe of trash and prepare for the production of only continuous veneer of the first thickness. (Executing peel break after only one rotation affords the maximum amount of continuous veneer of the first peel thickness upon reentry.) The knife reenters to cut veneer under the procedure established for the condition in which the first and second peel thicknesses are equal.

FIG. 5 shows a rotary veneer lathe whose knife motion is controlled in accordance with the present invention. With reference to FIG. 5, rotary veneer lathe 100 comprises lathe frame 102 that includes head stock 104 and tail stock 106. The wood block 20 is clamped between the chucks of lathe spindles 108 and 110, which are journaled for rotation in, respectively, head stock 104 and tail stock 106. Block 20 is, therefore, mounted for rotation about its longitudinal axis 111. A spindle motor 112 rotates drive shaft 114 which is coupled through mechanical linkages (not shown) to lathe spindles 108 and 110 to rotate block 20 in direction 48 as shown.

Knife 16 is mounted to lathe carriage 116, each side of which is connected to a different one of extensible rods 118 and 120 of hydraulic cylinders 122 and 124, respectively. The hydraulic cylinders cooperate to move the rods in a direction along their longitudinal axes to position knife 16 for engagement with and retraction from the surface of rotating block 20. The functions of hydraulic cylinders 122 and 124 are the same; therefore, a description of the operation of only hydraulic cylinder 122 is presented below. Components corresponding to hydraulic cylinder 124 are designated by identical reference numerals followed by primes.

The position of rod 118 is controlled by servo-valve 126, which receives at its input 128 an analog electrical signal that controls the amount of fluid to be delivered to cylinder 122 to move rod 118 to the desired position. A linear transducer 130 is operatively connected to the piston in hydraulic cylinder 122. Transducer 130 measures and develops at its output 132 a digital electrical signal corresponding to the position of rod 118, which position represents the distance of knife 16 from the surface of block 20.

Rotary encoder 134 includes gear 136 that is coupled by mechanical linkage (not shown) to the free end of drive shaft 114 for synchronized rotation at a rate that is proportional to that of block 20. Encoder 134 produces at its output 138 a serial stream of 12,000 uniformly spaced digital pulses for each complete rotation of block 20, or one pulse for each 0.03 degree of rotation.

Figure 6:
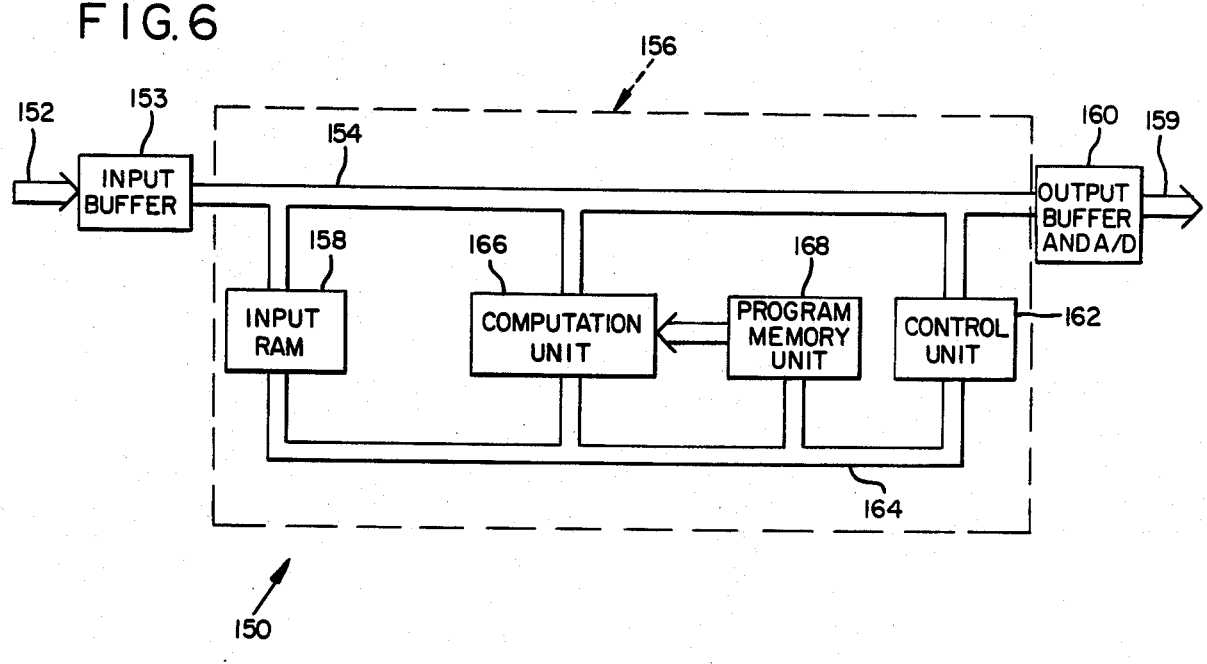
FIG. 6 is a block diagram showing a processing system that computes the parameters that generate the signals required to move the knife of a veneer lathe of the type shown in FIG. 5.

A control data processing system processes the electrical signals appearing at outputs 132, 132', and 138 to move knife 16 to the desired location relative to the surface of block 20 as will be described below. FIG. 6 shows a simplified block diagram of a preferred embodiment of control data processing system 150 designed to move knife 16 relative to the surface of block 20 in accordance with the present invention.

With reference to FIG. 6, an input buffer circuit 153 receives at its parallel input bus 152 sensor and other system input data that are delivered to system 150 for processing. The sensor input data are binary digital input signals produced at output 138 of rotary encoder 134 and outputs 132 and 132' of the respective transducers 130 and 130'. The other system data include commands and field settable data manually entered into a peripheral terminal (not shown) by an operator. Such data include, for example, the first and second peel thicknesses, the LTO, and the displacement angle 46. The system input data appear in sequence on the parallel output conductors of input buffer circuit 153 and on data bus 154 of a knife position processor 156. The data are stored in an input random access memory (RAM) 158 of knife position processor 156.

Knife position processor 156 is a microprocessor-based digital computer that is dedicated to process the system input data commands and develop output control signals in accordance with a preprogrammed operational function. The operational function represents the above-described mathematical operations that manipulate certain specified input information to develop signals that can be suitably conditioned and communicated as analog output signals from the parallel output bus 159 of output buffer circuit 160 to inputs 128 and 128' of the respective servo-valves 126 and 126' to control the movement of the knife relative to the surface of rotating block 20. Such conditioning entails digital-to-analog conversion of the computed digital signals by circuitry included in output buffer 160.

Whenever knife 16 is peeling continuous veneer of the first peel thickness, system processor 150 executes a program that develops in the following manner the signals which are communicated to servo-valves 126 and 126' to move knife 16. The pulse stream appearing at output 138 of rotary encoder 134 is delivered to knife position processor 156 through input buffer 153. A control unit 162, which presents signals on a control bus 164 to coordinate the various data transfer and computational functions performed in knife position processor 156, routes the pulse stream to a computation unit 166. During the peeling of continuous veneer, knife position processor 156 uses the first peel thickness, which was entered into processing system 150 by the operator and was stored in RAM 158, and provides at output 159 of output buffer 160 an analog signal to move the knife at the desired peel rate toward the block. Knife position processor 156 counts in 2.5 millisecond intervals the number of pulses appearing at output 138 of rotary encoder 134. In each such time interval, the analog signal at output 159 of output buffer 160 causes knife 16 to move into block 20 until the output signals 132 and 132' of the respective transducers 130 and 130' indicate that the rods have moved the amount required to peel veneer of the desired thickness during that time interval. The details of the computation of an analog voltage to move the knife of a veneer lathe to cut veneer of a predetermined thickness are known in the art and are not described here.

Whenever the operator enters a PEEL BREAK command, control unit 162 delivers a command to a program memory unit 168 to execute the instructions stored therein for retracting knife 16 away from block 20 to accomplish the task. Program memory unit 168 causes computation unit 166 simultaneously (1) to deliver to output buffer 160 a signal that causes servo-valves 126 and 126' to retract knife 16 at a preassigned rapid rate from the surface 19 of block 20 and (2) to store in RAM 158 the break pulse number, which identifies the pulse that occurred when the PEEL BREAK command was executed.

The operational function program stored in program memory unit 168 for execution during peel break next causes control unit 162 to deliver the knife position data corresponding to the signals appearing at outputs 132 and 132' of the respective transducers 130 and 130' to computation unit 166. The knife position data are compared in computation unit 166 with the desired knife position value of twice the first peel thickness, which is stored in program memory unit 168. As soon as the actual and stored knife position data compare, computation unit 166 delivers a signal to output buffer 160 to stop movement of knife 16.

Program memory unit 168 next causes the delivery from RAM 158 of the first peel thickness and the LTO 34 to computation unit 166 for computation of the desired knife standby location 30. Computation unit 166 computes the sum of the first peel thickness and the LTO, determines the standby location 30, and then delivers the appropriate signal to output buffer 160 to move knife 16 in a direction toward block 20 until the actual and stored knife position data again compare. As soon as these data compare, computation unit 166 delivers a signal to output buffer 160 that stops movement of the knife. Knife 16 rests at standby location 30 until processing system 150 receives a RESUME PEELING command.

Whenever processing system 150 receives a RESUME PEELING command, knife position processor 156 develops output signals to move the knife in accordance with one of three knife-positioning operational function programs stored in program memory unit 168. The relationship between the first peel thickness and the second peel thickness specifies the particular program to be executed.

The processing system responds to a command to resume peeling veneer in the following manner. The receipt of a RESUME PEELING command initiates the operation of processing system 150. The command reaches control unit 162 through input buffer 153 and data bus 154. Control unit 162 delivers on control bus 164 a command to program memory unit 168 to read from input RAM 158 and deliver to computation unit 166 the stored values for the first peel thickness and the second peel thickness. Program memory unit 168 next delivers a command to computation unit 166 that these values be compared. The result of the comparison is communicated through control bus 164 to control unit 162 which directs program memory unit 168 to execute the appropriate knife-positioning program.

Program memory unit 168 presents instructions to perform the following functions that are common to all three of the knife-positioning programs. Computation unit 166 first obtains from RAM 158 the break pulse number, which identifies the first cutting location 18 on block 20. Computation unit 166 next obtains from RAM 158 a constant that represents the desired displacement angle 46 that separates first cutting location 18 from second cutting location 42a, which is the knife reengagement location for the situation in which the first and second peel thicknesses are equal. (A constant having a decimal value of 67 represents a displacement angle 46 of about 2°). Computation unit 166 subtracts the constant from the stored break pulse number. The result is a knife position difference number which is stored in a register located in computation unit 166 and is compared to the block rotation numbers that are counted in a modulus 12,000 counter located in knife position processor 156 as the serial stream of 12,000 digital pulses is received from output 138 of rotary encoder 134. As stated earlier, 12,000 pulses represent one complete rotation of block 20.

Entry of a RESUME PEELING command enables knife position processor 156 to deliver a signal to output buffer 160 to move knife 16 from standby location 30 toward block 20 as soon as the block rotation number matches the previously computed knife position difference number. The subtraction of the constant causes processing system 150, therefore, to anticipate the approach of first cutting location 18. This is the stage at which the three knife-positioning programs cease common operation.

Whenever the second peel thickness equals the first peel thickness, program memory unit 168 presents additional instructions to perform the following functions. When the match occurs between the knife position difference number and the block rotation number, knife 16 immediately moves toward block 20 at a first peel rate computed by computation unit 166 from the values of the first peel thickness and the LTO stored in RAM 158. Computation unit 166 computes the sum of these two numbers and uses the sum to compute the first peel rate. Program memory unit 168 commands computation unit 166 to deliver a signal to output buffer 160 that causes knife 16 to move toward block 20 at the first peel rate for one block rotation. Knife 16 engages block 20 at second cutting location 42a after the one block rotation. Upon the occurrence of the next succeeding match of the block rotation number and the knife position difference number, program memory unit 168 commands computation unit 166 to deliver a signal to output buffer 160 that causes knife 16 to move toward block 20 at a second peel rate computed for the second peel thickness. Knife 16 cuts continuous veneer of the second thickness as soon as it strikes first cutting location 18.

Whenever the second peel thickness is greater than the first peel thickness, program memory unit 168 executes most of the instructions described above for the situation when the first and second peel thicknesses are equal. The difference in instructions is that computation unit 166 computes the first peel rate only from the value of the LTO. The knife reengages block 20 at second cutting location 42b and commences peeling of continuous veneer of the second thickness as shown in FIG. 3.

Whenever the second peel thickness is less than the first peel thickness, program memory unit 168 presents additional instructions to perform the following functions. When the match occurs between the knife position difference number and the block rotation number, knife 16 immediately moves toward block 20 at a first peel rate computed by computation unit 166 from the values of the first and second peel thicknesses and the LTO stored in RAM 158. Computation unit 166 computes an integer thickness ratio which is defined as the integer value of the ratio of the second thickness to first thickness, multiplies the integer thickness ratio by the second peel thickness, compares the remainder of the thickness ratio to a constant equal to 0.05, and adds to the integer thickness ratio an amount equal to the second peel thickness if the remainder is less than 0.05. The result is subtracted from the sum of the first peel thickness and the LTO to give the distance knife 16 travels in one block rotation after the RESUME PEELING command is executed. Computation unit 166 computes the first peel rate that corresponds to the computed distance. Program memory unit 168 commands computation unit 166 to deliver a signal to output buffer 160 that causes knife 16 to move toward block 20 at the first peel rate for one block rotation.

Upon the occurrence of the next succeeding match of the block rotation number and the knife position difference number, program memory unit 168 commands computation unit 166 to deliver a signal to output buffer 160 that causes knife 16 to move toward block 20 at a second peel rate computed for the second thickness. The knife reengages block 20 at second cutting location 42c and commences peeling of continuous veneer of the thickness as shown in FIG. 4.

It will be appreciated that the anticipation of the approach of the first cutting location 18 (such anticipation being accomplished by means of the displacement angle 46 between first cutting location 18 and second cutting location 42a) in starting knife movement toward the block at the beginning of reentry is also carried out for the situations in which the first and second peel thicknesses are not equal. This is done only to simplify the program implementation and has no appreciable effect on the amount of waste veneer produced.

It will be obvious to those having skill in the art that many changes may be made in the above-described details of the preferred embodiment of the present invention. The scope of the present invention, therefore, should be determined only by the following claims.

What is claimed is:

1. In a control system for a veneer lathe having means for rotating a block about its longitudinal axis and means to move a knife toward or away from the surface of the rotating block, a method of controlling the motion of the knife, comprising:
   sensing the angular displacement of the rotating block as the knife engages and cuts from the block a veneer of a first peel thickness;
   moving the knife from a first cutting location to a standby location at a predetermined distance away from the surface of the block;
   storing information corresponding to the angular position of the first cutting location; and
   commanding the knife to move from the standby location toward the block and reengage it at a second cutting location that is computed from the stored information, the second cutting location differing from the first cutting location and enabling veneer to be cut at substantially the largest possible block radius that promotes production of essentially an optimal amount of veneer of a second peel thickness.

2. The method of claim 1 in which the predetermined distance equals the sum of the first peel thickness and a leading thickness offset which is not an integer multiple of the first peel thickness.

3. The method of claim 1 in which the first peel thickness equals the second peel thickness.

4. The method of claim 1 in which the knife reengages the block at the second cutting location before the block completes one rotation after the knife moves from the standby location.

5. The method of claim 1 in which the knife moves from the standby location at a first peel rate and cuts veneer of the second peel thickness at a second peel rate that is different from the first peel rate.

6. The method of claim 5 in which the second peel rate is less than the first peel rate.

7. The method of claim 5 in which the knife begins movement at the second peel rate when it engages the block at the second cutting location.

8. The method of claim 5 in which the predetermined distance equals the sum of the first peel thickness and a leading thickness offset, and the first peel rate causes the knife to move from the standby location toward the block after one rotation a distance substantially equal to the predetermined distance.

9. The method of claim 8 in which the second peel rate causes the knife to move toward the block in each successive rotation after the one rotation a distance substantially equal to the second peel thickness.

10. The method of claim 5 in which the knife begins movement at the first peel rate toward the second cutting location after a reference location on the surface of the rotating block passes the knife.

11. The method of claim 10 in which the reference location is angularly displaced from the first cutting location by a predetermined amount.

12. The method of claim 1 in which the radius of the block increases in the direction of block rotation from the first cutting location to the second cutting location whenever the knife reenters to cut veneer of the second peel thickness that is equal to the first peel thickness.

13. The method of claim 1 in which the radius of the block increases in the direction opposite to the direction of block rotation from the first cutting location to the second cutting location whenever the knife reenters to cut veneer of the second peel thickness that is greater or less than the first peel thickness.

14. The method of claim 1 in which the knife is moved from the first cutting location after a round-up procedure which comprises the steps of:
   cutting veneer at a peel rate to remove surface irregularities from the block; and
   subsequently cutting veneer at the first peel rate for at least one complete rotation of the block.

15. In a control system for a veneer lathe having drive means for rotating a block about its longitudinal axis and positioning means to move a knife toward or away from the surface of the rotating block, the improvement comprising:
   command means coupled to the positioning means to command said positioning means to move the knife to stop cutting veneer of a first thickness at a first cutting location and to move away from the block to a standby location, and.
   computing means for computing a reentry path for the knife to reengage the block at a second cutting location that enables the peeling of an optimal amount of veneer of a second thickness,
   the computing means being coupled to the command means to cause the positioning means to move the knife from the standby location at a first peel rate until it reengages the block surface at the second cutting location, and to move the knife from the second cutting location at a second peel rate to peel veneer of the second peel thickness.

16. The control system of claim 15 in which the first peel rate exceeds the second peel rate.

17. The control system of claim 15 which further comprises:
   sensing means to sense the angular displacement of the rotating block;
   memory means to store a position angle corresponding to the angular disposition of the first cutting location as the knife moves away from the block;
   and comparison means for producing a command to move the knife from the standby location whenever a reference location on the rotating block and the position angle differ by a predetermined amount.

18. The apparatus of claim 15 in which the knife moves from the standby location at a first peel rate and cuts veneer of the second peel thickness at a second peel rate that is different from the first peel rate.

19. The apparatus of claim 18 in which the second peel rate is less than the first peel rate.

20. The apparatus of claim 18 in which the knife begins movement at the second peel rate when it engages the block at the second cutting location.

* * * * *